(12) United States Patent
Gosselink et al.

(10) Patent No.: US 6,916,562 B1
(45) Date of Patent: Jul. 12, 2005

(54) HYDROCARBON HYDROCONVERSION PROCESS FOR THE PRODUCTION OF HYDROGEN, HYDROPROCESSED HYDROCARBONS AND ELECTRICITY

(75) Inventors: Johan Willem Gosselink, Amsterdam (NL); Michiel Jan Groeneveld, Amsterdam (NL); Andreas Karl Nowak, Amsterdam (NL); Antonius Adrianus Maria Roovers, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/030,932

(22) PCT Filed: May 9, 2000

(86) PCT No.: PCT/EP00/04396
§ 371 (c)(1),
(2), (4) Date: Nov. 12, 2001

(87) PCT Pub. No.: WO00/69989
PCT Pub. Date: Nov. 23, 2000

(30) Foreign Application Priority Data

May 13, 1999 (EP) .............................. 99303736

(51) Int. Cl.$^7$ ............................................ H01M 8/041
(52) U.S. Cl. .......................................................... 429/17
(58) Field of Search ............................................ 429/17

(56) References Cited

U.S. PATENT DOCUMENTS

| | | | |
|---|---|---|---|
| 3,189,538 A | 6/1965 | Pohlenz et al. ............... 208/51 |
| 3,224,958 A | 12/1965 | Haritatos et al. .............. 208/78 |
| 3,463,611 A | 8/1969 | Haritatos et al. |
| 4,197,187 A | * 4/1980 | Day et al. .................... 208/138 |
| 4,522,894 A | * 6/1985 | Hwang et al. ................. 429/17 |
| 5,149,600 A | * 9/1992 | Yamase et al. ................ 429/17 |
| 5,284,717 A | 2/1994 | Yamase et al. |
| 5,681,540 A | * 10/1997 | O'Brien .................... 423/573.1 |
| 6,190,430 B1 | * 2/2001 | Fukuoka et al. ........... 48/198.3 |
| 6,383,670 B1 | * 5/2002 | Edlund et al. ................ 429/20 |

FOREIGN PATENT DOCUMENTS

| DE | 18 16 828 A | 7/1969 |
|---|---|---|
| EP | 0 214 717 A | 3/1987 |
| WO | 00/69990 | 11/2000 |

* cited by examiner

Primary Examiner—Patrick Joseph Ryan
Assistant Examiner—Thomas H. Parsons

(57) ABSTRACT

A method for treating hydrocarbonaceous feedstock to produce hydrogen, electricity, and one or more liquid hydrocarbon product, the method comprising: (a) subjecting hydrocarbonaceous feedstock to hydrotreating hydrogen in the presence of supported catalyst under hydrotreating conditions effective to produce hydrotreated product comprising one or more liquid hydrocarbon product; (b) subjecting hydrotreated product to hydrogen production conditions effective to produce hydrogen product and hydrogen production remainder; (c) subjecting a first part of the hydrogen product to electricity generating conditions effective to produce electricity; and (d) recycling a second part of the hydrogen product as hydrotreating hydrogen.

65 Claims, 1 Drawing Sheet

US 6,916,562 B1

HYDROCARBON HYDROCONVERSION PROCESS FOR THE PRODUCTION OF HYDROGEN, HYDROPROCESSED HYDROCARBONS AND ELECTRICITY

CROSS-REFERENCE TO RELATED APPLICATIONS

The present application is the U.S. national phase of PCT/EP00/04396, filed May 9, 2000 claiming priority of EP 99303736.5, filed May 13, 1999.

BACKGROUND OF THE INVENTION

The application relates to hydrocarbon processing in order to produce hydrogen, electricity, and at least one hydroprocessed product.

BRIEF SUMMARY OF THE INVENTION

In one aspect, the application provides a method for treating hydrocarbonaceous feedstock to produce hydrogen, electricity, and one or more liquid hydrocarbon product. In this aspect, the method comprises: a) subjecting hydrocarbonaceous feedstock to hydrotreating hydrogen in the presence of supported catalyst under hydrotreating conditions effective to produce hydrotreated product comprising one or more liquid hydrocarbon product; b) subjecting hydrotreated product to hydrogen production conditions effective to produce hydrogen product and hydrogen production remainder; c) subjecting a first part of the hydrogen product to electricity generating conditions effective to produce electricity; and d) recycling a second part of the hydrogen product as hydrotreating hydrogen.

In another aspect, the application provides a method for treating hydrocarbonaceous feedstock to produce hydrogen, electricity, and hydroprocessed product. In this aspect, the method comprises: a) subjecting hydrocarbonaceous feedstock to hydrotreating hydrogen under hydrotreating conditions comprising supported zeolite catalyst effective to produce hydroprocessed product; b) subjecting at least a portion of the hydrotreated product to hydrogen production conditions effective to produce hydrogen product; c) subjecting a first part of the hydrogen product to electricity generating conditions effective to produce electricity; and d) recycling a second part of the hydrogen product as hydrogenating hydrogen.

DETAILED DESCRIPTION OF THE INVENTION

Figure 1:
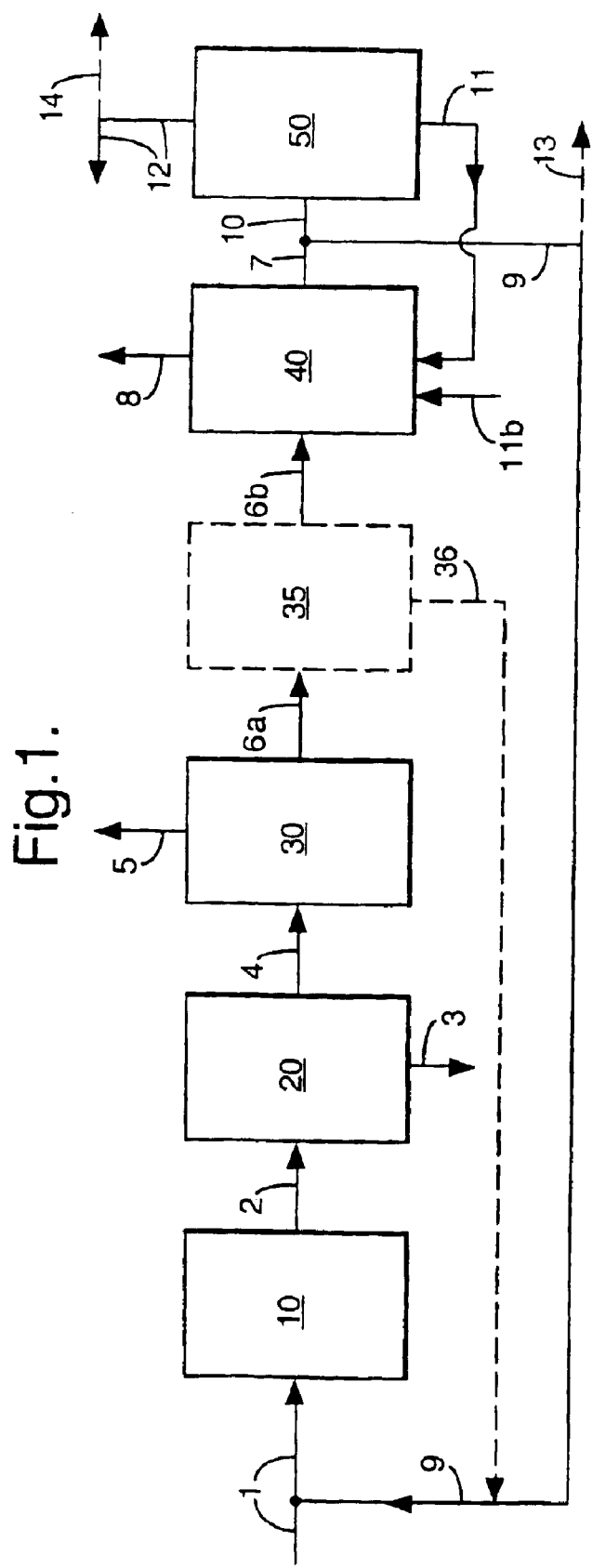
FIG. 1 is a schematic illustration of the process of the present application.

The object in conventional refining is to convert a hydrocarbonaceous feedstock into one or more useful products. Depending on feedstock availability and the desired product slate, many hydrocarbon conversion processes have been developed over time. Some processes are non-catalytic such as visbreaking and thermal cracking, others like fluidized catalytic cracking (FCC), hydrocracking and reforming are examples of catalytic processes. FCC and reforming are processes which, although very different in configuration, have two things in common; they are carried out in the presence of a catalyst and are focused on the production of hydrocarbonaceous materials having a different composition from the feedstock used.

Emphasis is normally directed to producing one or more valuable hydrocarbonaceous products. For instance, FCC and reforming are processes specifically directed at producing large amounts of gasoline as the primary product (the FCC operation will normally also produce some lower olefins and the reforming operation will also produce some hydrogen) whereas hydrocracking is directed, depending on the operating conditions, to the production of naphtha or middle distillates.

In view of the value of hydrocarbons, in particular liquid hydrocarbons, as transportation fuels, it will be clear the maximising the production of a single hydrocarbon product, whether it is gasoline or diesel, or optimising the product slate in the event that two or more valuable products are to be produced, is very important in designing refineries, whether they are grass-root refineries, revamps of existing units or additions to existing units. Therefore, the production of by-products (such as lower olefins or hydrogen) will normally be minimised or, when there is a specific need for such products, always be considered in the context of not sacrificing too much of the main products.

It is of course known, and well documented, that products like lower olefins and hydrogen can be produced from specific sources, which are normally of hydrocarbonaceous nature. But in such processes, the objective is to maximise the production of such products and therefore, there is no or virtually no production of other hydrocarbonaceous products at the same time.

For instance, a well known process to produce hydrogen is by gasification of methane or by electrolysis of water. Such processes do not produce valuable liquid hydrocarbons. Lower olefins, like propane and butene are suitably produced by (catalytic) dehydrogenation of the corresponding alkanes (propane and butane). Again such processes do not produce valuable liquid hydrocarbons.

In many industrial sites there are facilities which operate in a complementary manner. For instance, the hydrogen needed for hydrogenative processes is produced via a dedicated gasification process and olefins which are suitable feedstock for e.g. polymerisation processes to be carried out on the same or a neighboring site are to be produced via an FCC unit which still produces gasoline as the main product.

As regards the production of electricity, it is well known that electricity (as main product and in many cases as the only product) can be produced from a variety of organic feedstocks, ranging from coal and natural gas to oil or residual materials. Again, it will be clear that in such process liquid hydrocarbons will not be produced.

It has been proposed in EP-A-435736 to produce electricity from a fuel cell which is fed by hydrogen produced by upgraded reformer fuel by subjecting low boiling petroleum fuels to a cracking/desulphurization treatment at pressures not exceeding 10 kg/cm$^2$ in the presence of an unsupported zeolitic catalyst. Under the conditions as described in EP-435736 it appears that substantial amounts of unwanted aromatic compounds are formed even when operating at pressures as low as 5 kg/cm$^2$.

There is, however, a need to be able to produce hydrogen, electricity and one or more (liquid) hydrocarbon products in an integrated process. In particular, there is a need for a process which will allow operators flexibility with respect to the relative amounts of the three key products (hydrogen, electricity and (liquid) hydrocarbon product(s)) to be obtained. In areas where utilities and/or complementary production sites are not available, an integrated process producing, in essence, the three key products may be the only option available. It would also be of great interest if such an integrated process could be carried out both on a large and one a small scale or could be used as additional support to existing plants.

It has now been found that it is possible to combine the diverging goals of producing both hydrogen, electricity as well as at least one hydroprocessed hydrocarbon product. Moreover it has been found, that, depending on the local requirements, the product slate (for the three key products) can be very flexible which allows a very wide window of application.

The present invention therefore relates to a method for producing hydrogen, electricity and at least one hydroprocessing product from a hydrocarbonaceous feedstock comprising at least a fraction which has a boiling point range which is the same or higher than the boiling point range of the hydroprocessed product to be produced, which method comprises subjecting the hydrocarbonaceous feedstock to a treatment with hydrogen in the presence of a supported catalyst, which hydrogen has been produced at least partly from a fraction of the hydrotreated feedstock having a boiling point range different from the boiling point range of the fraction of the hydrocarbonaceous feedstock from which the hydroprocessed product will be produced, or from at least part of said hydroprocessed product, separating the hydroprocessed product from hydrotreated feedstock, when hydroprocessed product is to be recovered and subjecting part or all of the remaining hydrotreated feedstock and the hydroprocessed product if it is not to be recovered to a treatment to product hydrogen and subjecting part or all of the hydrogen not used for the treatment with hydrogen to a treatment to produce electricity, or subjecting part of the hydrotreated feedstock and the hydroprocessed product if it is not to be recovered to a treatment to produce electricity and at least part of the remainder to a treatment to produce hydrogen.

Depending on the specific requirements of the infrastructure in which the method according to the present invention is to be carried out, operators will have the choice to direct the product slate towards producing all three key products (hydrogen, electricity and a hydroprocessed product) or to direct the process to the production of two products or even to a single product.

In the event that hydrogen and electricity are the desired products, and there is no need to produce hydroprocessed product as well, the total amount of hydrocarbonaceous material (both remaining after the treatment with hydrogen and the hydroprocessed product) will serve as feedstock for the subsequent production of hydrogen and electricity.

It is a preferred feature of the method according to the invention that at least those amounts of hydrogen and electricity are produced which are required to satisfy the internal needs of the method in terms of hydrogen to be used in the treatment with hydrogen and of the electricity needed to run the process from a utility point of view. It is, of course, possible to supply part of the hydrogen and/or part of the electricity needed for the method as such from external sources, provided that they are or can be made available.

Having secured these intrinsic requirements, the refiner can still choose to optimise the production in terms of hydrogen or electricity as the main product. In the event that hydrogen is required as the main product, only the amount of electricity needed to operate the plant will be produced and in case the emphasis is on producing electricity as the main product, only the amount of hydrogen needed to satisfy the internal demand (hydrogen to be used in the treatment with hydrogen) will be produced and the remainder of the hydrogen produced will serve as feedstock for producing electricity.

Hydrocarbonaceous feedstocks which can be suitably applied in the method according to the present invention are those ranging from having an initial boiling point of about ambient to those having a final boiling point of about 650° C., measured under standard conditions of temperature and pressure (20° C. and 1 atmosphere). It will be clear that the feedstocks which can be applied in the method according to the present invention do not need to have a boiling range profile encompassing the total range disclosed hereinabove. Feedstocks having a boiling point range such that their 90% boiling point (i.e. the temperature at which 90% of the feedstock would have been distilled off in a distillation process) lies in the range between 400 and 600° C. can be advantageously applied. Preference is given to feedstocks having a 90% boiling point in the range between 450 and 600° C. Good results can be obtained with feedstocks having a 90% boiling point in the range from 475 to 550° C.

Examples of feedstocks which can be suitably applied are naphtha, kerosene and various types of gas oils such as atmospheric gas oil and vacuum gas oil. Also cycle oils can be suitably applied. Not only feedstocks from mineral origin but also from synthetic origin can be applied. Synthetic or semi-synthetic feedstocks are preferred from a low sulphur and/or nitrogen point of view as such feedstocks reduce the necessity of having sulphur and/or nitrogen removing processes forming part of product upgrading. Hydrocarbonaceous material produced from syngas via the so-called Fischer-Tropsch process form a very useful feedstock for the method according to the present invention as such feedstocks would obviate the need for sulphur and/or nitrogen treatment and removal facilities.

It is possible that the hydrocarbonaceous feedstocks to be applied in the method according to the present invention contain also materials boiling below ambient temperature. Such materials may be present in the feedstock to be applied or can be added to such feedstock. Reference is made to the presence of lower hydrocarbons or hydrocarbon fractions such as liquefied petroleum gas.

It is advantageous to use a feedstock which contains between 5 and 40% by weight of material having a boiling point range which is the same or higher than the boiling point range of the hydroprocessed product to be recovered from the hydrotreated feedstock (and which, as the case may be, can be used at least in part as feedstock for producing hydrogen in order to serve the intrinsic need of the process according to the present invention or serve as the final hydroprocessed product). It is preferred to start with a feedstock containing between 5 and 40% by weight of material having a boiling point range about the maximum boiling point of the hydroprocessed product to be recovered from the hydrotreated feedstock.

Feedstocks containing sulphur containing materials can also be processed. Normally, the amount of sulphur will not exceed 5% by weight, and preferably will not exceed 3% by weight. Preference is given to feedstocks containing even lower amounts of sulphur, or no sulphur at all.

It will be clear to those skilled in the art that extraneous hydrogen will have to be introduced at least in the context of the start-up of the method according to the present invention. For instance, use can be made of hydrogen available in storage containers. Part or all of the hydrogen to be consumed during the hydrotreating step of the method according to the present invention will be generated in the hydrogen manufacturing unit forming part of the line-up.

The treatment with hydrogen in the presence of a supported catalyst in accordance with the method according to the present invention is in essence a treatment to change the composition of the feedstock, i.e. a hydroconversion process. The severity of the hydrotreatment depends on the desired hydroprocessed product to be obtained in relation to the feedstock to be subjected to the treatment with hydrogen.

The hydrotreatment process in accordance with the method according to the present invention can be suitably carried out at temperatures in the range between 100° C. and 550° C., preferably between 250° C. and 450° C. Pressures up to 400 atmospheres can be applied, preference is given to pressures in the range between 10 and 200 atmospheres.

In the event that the method according to the present invention aims at producing kerosene and/or middle distillates as hydroprocessed product which will at least partly be recovered and not used for other duties (i.e. hydrogen and electricity are produced primarily from the remaining hydrotreated feedstock) the treatment with hydrogen will in essence be a hydrocracking operation in which the heavier parts of the feedstock will be converted in a hydrocracking-mode of operation.

At the same time, in the method according to the present invention also at least part of the hydrogen to be used in the treatment with hydrogen has to be generated. Therefore, catalysts are preferably used which are capable of converting not only that part of the feedstock which delivers the hydroprocessed product but also contribute to converting other parts of the feedstock to such an extent that the remaining hydrotreated feedstock is a good source for hydrogen production. In other words, preference is given to catalysts which also produce large amounts of lower boiling materials (besides the hydroprocessed product).

Examples of supported catalysts which can be used in the treatment with hydrogen in accordance with the method in accordance with the present invention are zeolitic catalysts having a tendency to over-crack hydrocarbonaceous material from a conventional point of view (in which as far as possible only those fractions of the feedstock are cracked which deliver the desired hydrocrackate whilst preserving as much as possible of the initial feedstock, or at least to the extent that liquid material will remain and therefore minimising the production of gaseous material). In the method in accordance with the present invention, it is advantageous to apply hydrocracking catalysts which are capable of producing besides the desired product(s) also a fair amount of lower boiling materials, which, from a conventional hydrocracking point of view is not preferred at all. Examples of such catalysts can be based on zeolite beta, ultrastable zeolite Y, ZSM-5, erionite and chabazite. It will be clear to those skilled in the art which specific zeolitic material and which specific metal(s) having hydrocracking capabilities can be used, taking into account that preference is given to catalysts giving rather high yields on relatively light products as such products reduce the severity of that part of the process which is directed at the production of hydrogen. As an example, suitable catalysts comprise zeolite beta containing one or more of Group VI and/or one or more of Group VIII metals. Examples of Group VI metals comprise Mo and W. Examples of Group VIII metals comprise Ni, Co, Pt and Pd. Suitable catalysts contain between 2 and 40% by weight of Group VI metals and/or between 0.1 and 10% by weight of Group VIII metals.

Examples of suitable support materials are alumina, silica, silica-alumina, magnesia and zirconia and mixtures of two or more of such materials. Alumina is a preferred support material, optionally in combination with silica-alumina.

Also combinations of two or more catalysts can be suitably applied. Examples of catalyst combinations include so-called stacked-bed catalysts which comprises using different beds filled with (different) catalytic material. The choice of the specific combinations of catalyst beds will be dependent on the process mode envisaged as is known to those skilled in the art.

Conversions on hydrocarbonaceous feedstocks of 50% wt or more per pass can be obtained. Preferably, at least 65% wt of the feedstock, and most preferably 90% wt of the feedstock, is converted in the method in accordance with the presence invention.

It is also possible that the composition of the initial feedstock and the product slate desired (hydrogen, electricity and hydroprocessed product—which may also be used partly or in toto for the production of hydrogen and electricity) are related in such a way that the treatment with hydrogen does not need to be such that a decrease in the boiling point range of the hydroprocessed product will be needed. In other words, there may be a fraction present in the feedstock which already has the envisaged product properties of the hydroprocessed product. This would mean that the emphasis of the treatment with hydrogen would be on the composition of the remaining hydrotreated feedstock (left over after recovery of the appropriate hydroprocessed product). Such treatment will be in essence a treatment to saturate olefinic and/or aromatic material present in the feedstock, optionally together with removal of heteroatoms containing species, possibly accompanied with a small amount of hydrocracking.

Catalysts which can be suitably applied under such conditions comprise conventional hydrotreating catalysts. Examples of such catalysts comprise alumina, silica or silica-alumina based hydrotreating catalysts containing one or more Group VI and/or Group VIII metals. Examples of Group VI metals comprise Mo and W. Examples of Group VIII metals comprise Ni and Co. Suitable catalyst systems comprise Co and Mo or Ni and Mo on alumina or amorphous silica-alumina.

In the event that the refiner selects to produce as final product only hydrogen and/or electricity, all of the hydroprocessed product will serve, together with the hydrotreated feedstock as feed for the production of hydrogen and electricity. At least some of the hydrogen product will be used in the method according to the present invention in order to satisfy at least part of the process conditions required in connection with the treatment with hydrogen, the remainder can be used at least in part to generate at least part of the electricity needed in the process and the remainder will either be seen as final product, or depending on the local infra-structure will be converted at least partly into electricity.

An important embodiment of the method according to the present invention is one wherein hydrotreated kerosene is the hydroprocessed product to be recovered from the process, hydrogen is produced in such amount as to satisfy the internal needs of the process and electricity is produced not only to be used in the running of the process but is also available for export to the local grid.

The remaining hydrotreated feedstock, optionally in combination with part, or even all of the hydroprocessed product in cases that there is no direct outlet for that product, can be subjected to a treatment to produce hydrogen of which at least part is used to satisfy the hydrogen requirement of the process according to the present invention, or part of it can be subjected to a treatment to produce electricity whilst the remainder is subjected to a treatment to produce hydrogen.

As some hydrogen may already be present in the feedstock to the hydrogen-producing machine, it can be useful to separate it and use it as part of the amount of hydrogen needed to satisfy the hydrogen requirement of the process. This can be conveniently done by subjecting the remaining hydrotreated feedstock to a separation process involving a membrane which will allow passage of hydrogen whilst retaining heavier molecules. Those skilled in the art know which membrane to use and how to operate such membrane.

There are many processes known in the art which are capable of producing hydrogen from hydrocarbonaceous feedstocks. Those skilled in the art know such processes and how to operate them. A convenient process is catalytic (partial) oxidation. Other suitable processes are steam-methane reforming and catalytic dehydrogenation of lower alkanes such as propane or butane.

A preferred hydrogen-producing system can be found in the combination of catalytic partial oxidation and the watergas-shift reaction which last reaction, in essence, converts carbon monoxide, produced together with hydrogen in the catalytic partial oxidation reaction, in the presence of water (steam under the process conditions) to hydrogen and carbon dioxide. The net result of the combined catalytic partial oxidation/watergas-shift reaction is that hydrocarbonaceous material is converted into hydrogen and carbon dioxide.

Normally, the combined catalytic partial oxidation/watergas-shift process can be operated at a efficiency of at least 50%, calculated on hydrogen produced, preferably with an efficiency of at least 65% on hydrogen produced (not taking into account hydrogen present in the hydrotreated feedstock).

Suitable catalysts for the catalytic partial oxidation process according to the present invention comprise one of more metals of Group VIII of the Periodic Table of the Elements supported on a carrier. Examples of suitable metals comprise rhodium, iridium and ruthenium as well as combinations of one or more of these metals. Especially carriers having a high tortuosity can be suitably applied. Suitable process conditions comprise using oxygen:carbon molar ratios in the range between 0.30 and 0.80, preferably between 0.45 and 0.75, and most preferably between 0.45 and 0.65; temperatures between 800° C. and 1200° C., in particular between 900° C. and 1100° C. whilst using a gas velocity in the range between 100,000 and 10,000,000 l/kg/hr, preferably in the range between 250,000 and 2,000,000 l/kg/hr.

An advantage of the method according to the present invention is that when hydrogen is produced as the main product, carbon dioxide is produced at the same time in appreciable amounts which may be useful for commercial operations such as for enhanced oil recovery or for heating purposes in the event that an appropriate infrastructure is available (such as urban communities and/or green-house agriculture).

The method according to the present invention also provides for the production of electricity. This can be achieved as a final step of the method according to the present invention when electricity is to be produced from hydrogen generated already but it can also be produced from part of the hydrotreated feedstock and the hydroprocessed product if it is not to be recovered whilst at least part of the remainder is subjected to a treatment to produce hydrogen. Preferably, during normal operation, at least sufficient electricity will be produced to satisfy the requirements from an operational point of view. Again, it will be clear that during the start-up of the process according to the invention, external electricity will be needed.

Electricity can be produced by many processes known to those skilled in the art. They also know how to operate such processes which convert hydrogen into electricity. A fuel cell is an example of a process which can be used to convert hydrogen into electricity. When operating the fuel cell, water (steam) will be produced as well which can be used conveniently to form at least part of the steam required to operate the watergas-shaft reaction when combined with the catalytic partial oxidation process yielding hydrogen in accordance with the process according to the present invention.

The fuel cell will be preferably operated in such a way that it produces at least the amount of electricity needed to satisfy the internal needs of the method according to the present invention. In situations where there is no need for producing more hydrogen than is necessary to satisfy (part or all of) the internal demands of the method according to the present invention, the focus will be either on optimising the production of hydroprocessed product as a directly marketable transportation fuel (and thus producing the minimum amount of hydrogen and electricity needed for captive use), or on optimising the production of electricity, taking the market demand for hydroprocessed product into account. An extreme could be that all hydroprocessed product together with all remaining hydrotreated feedstock is converted into hydrogen which then is converted into electricity which then has become the only export product of the integrated process (having satisfied the internal needs on hydrogen and electricity as stated hereinabove).

The efficiency of the fuel cell to be used in the method according to the present invention should be at least 30%, calculated on hydrogen feedstock. Preference is given to process conditions which allow conversion of at least 40%, and most preferably 50% of hydrogen intake.

Since the feedstocks containing up to about 5% by weight of sulphur can be used in the method according to the present invention, the treatment with hydrogen will cause the production of hydrogen sulphide. It will be clear that in such instances a further process step will be necessary to remove hydrogen sulphide from the hydrotreated feedstock and to convert it into sulphur. When the pressure is released prior to separating off the hydroprocessed product, hydrogen sulphide will be removed preferentially and can be sent to a further processing unit such as a SCOT-unit, or if the concentration of hydrogen sulphide is large enough it can be fed directly to a CLAUS-unit. Those skilled in the art know such processing facilities and how to operate them.

Various embodiments of the method according to the present invention can be schematically illustrated by means of FIG. 1.

In FIG. 1 a process embodiment is illustrated in which a sulphur-containing feedstock is processed in such a way as to deliver at least one hydroprocessed product to be recovered as marketable product together with hydrogen and electricity for use in the process according to the present invention.

A feedstock is introduced via line 1 into hydrotreatment unit 10 in which the feedstock is subjected to a treatment with hydrogen in the presence of a supported catalyst which is introduced into line 1 via line 9. From hydrotreatment unit 10 the hydrotreated feedstock is sent via line 2 to a separating unit 20 from which a hydroprocessed product will be obtained which is recovered via line 3 and a hydrogen sulphide containing hydrotreated stream will be obtained which is sent via line 4 to a hydrogen sulphide removal unit 30. From unit 30 a hydrogen sulphide containing stream will be obtained which is sent via line 5 to a sulphur recovery unit (not shown) to produce sulphur, and a hydrogen sulphide depleted hydrotreated stream which can be sent via line 6a to hydrogen separating unit 35 (or in the event that hydrogen is not separated at this part in the process directly via line 6 (6a+6b) to hydrogen manufacturing unit 40) from which hydrogen separated off is sent back via line 36 to line 1 as part of the hydrogen needed in hydrotreatment unit 10 and the remaining hydrogen sulphide (and optionally hydrogen) depleted hydrotreated feedstock is sent via line 6b to hydrogen manufacturing unit 40. In the event that this unit contains a catalytic partial oxidation stage and a watergas-shift stage, water (or steam) will be sent to the watergas-shift stage via line 11. If desired, additional water (or steam) can be sent to the watergas-shift stage via line 11b. Carbon dioxide will be obtained via line 8 and hydrogen produced will be sent back to the hydrotreating unit 10 via lines 7 and 9 (optionally together with hydrogen via line 36) whereas the amount of hydrogen needed to produce part or all of the electricity required from a utilities point of view is sent via line 10 to electricity generating unit 50 (suitably a fuel cell). Electricity produced in unit 50 will be sent back to the appropriate places in the process line up (not shown) via line 12 and water produced in the electricity generating unit 50 can be sent back to hydrogen manufacturing unit 40 via line 11.

In FIG. 1 two other embodiments are also given. In the event that it is desired to produce excess hydrogen (i.e. more hydrogen than is needed to operate hydrotreatment unit 10 in the appropriate manner) the ratio between hydroprocessed product obtained and hydrogen sulphide depleted hydrotreated feedstock will be altered in such a way that the additional amount of hydrogen will be produced in hydrogen manufacturing unit 40 and it will be recovered via line 13. Likewise, in the event that it is desired to produce excess electricity (i.e. more electricity than is needed to satisfy the operational demands for the process as envisaged) the amount of hydrogen produced (and, accordingly, the production of hydroprocessed product) will be changed so as to accommodate the production of the excess amount of electricity which can be recovered via line 14.

In FIG. 1 a further process embodiment can be illustrated in which a sulphur containing feedstock is processed in such a way that all hydrotreated feedstock (including the fraction which is recovered as hydroprocessed product in the embodiments as depicted in FIG. 1) is used to produce excess hydrogen and excess electricity, i.e. a process in which apart from sulphur and carbon dioxide, only hydrogen and electricity are the final products. In this embodiment the hydroprocessed product normally to be recovered via line 3 is now sent together with hydrotreated feedstock via line 4 to hydrogen sulphide removal unit 30 whereafter the further steps are as depicted in FIG. 1.

A further embodiment is that wherein use is made of a sulphur-free feedstock (i.e. of a feedstock of synthetic or semi-synthetic nature or of a feedstock which has already been subjected to a hydrosulphurization treatment). In such embodiment, it is no longer necessary to separate off a hydrogen sulphide containing hydrotreated feedstock (or to send the total hydrotreated feedstock to the (optional) hydrogen separating unit) which means that the process as schematically represented in FIG. 1 is now operated without using hydrogen sulphide removal unit 30.

EXAMPLES

The method according to the present invention can be illustrated by the following prophetic examples.

Example 1

A hydrocarbonaceous feedstock having an IBP of 121° C. and a 90% boiling point of 533° C. and containing 0.02% by weight of sulphur can be passed (in an amount of 10 tons/day together with 1.5 tons/day of hydrogen) over a zeolite-beta type alumina-supported catalyst in hydrotreatment unit 10 under conditions to convert in single pass 90% wt of the feedstock to lower boiling material. As product, 85% wt, calculated on hydrocarbonaceous feedstock intake, of a hydroprocessed product (comprising naphtha, kerosene and gas oil) can be obtained whilst the remaining hydrotreated feedstock can be sent to the hydrogen sulphide removal unit. After separating off hydrogen present in the hydrotreated feedstock (and returning it to the feedstock to be used as part of the hydrogen needed in hydrotreatment unit) after leaving the hydrogen sulphide removal unit, 15% wt, calculated on hydrocarbonaceous feedstock, can be sent to hydrogen manufacture unit 40 (containing a catalytic oxidation unit in conjunction with a watergas-shift reactor) to which steam in an amount of 2.1 ton/day can be added. Under the prevailing conditions, 325 kg/day of hydrogen can be produced (together with the formation of 5.1 tons/day of carbon dioxide). From the hydrogen produced in the hydrogen manufacturing unit, 125 kg/day can be used as feedstock for the electricity generating unit 50 (suitably a fuel cell) which will have the capability to convert this hydrogen with about 40% efficiency into 70 kW of electricity which can be sent to the appropriate places in the process line up whilst 200 kg/day of hydrogen to balance hydrogen consumption in the hydrotreatment step, is directly sent to the hydrotreatment unit (together with hydrogen already recovered from the hydrogen separating unit). In the process 5.1 tons/day of carbon dioxide and 900 kg/day of steam (which can be used in the hydrogen manufacturing unit) can be co-produced.

Example 2

A hydrocarbonaceous feedstock as defined in Example 1 can be subjected to a treatment as described in Example 1 in hydrotreatment unit 10 (with a hydrogen consumption of 200 kg/day of hydrogen) under conditions which allow 90% conversion per pass of feedstock to lower boiling material. Under these conditions 45 % wt kerosene and gas oil can be produced as hydroprocessed product. After removal of hydrogen sulphide and separating off hydrogen 55% wt, calculated on initial intake of material, containing naphtha and lower boiling materials can be sent to the hydrogen manufacturing unit to which 7 ton steam/day is sent as well. Under normal conditions 1.1 ton/day of hydrogen can be produced of which 125 kg/day is sent to the electricity generating unit to produce 70 kW of electricity whilst 775 kg/day of hydrogen will be available for export, the remainder can be used to satisfy part of the hydrotreatment requirements in hydrotreatment unit 10. In the process 17 ton/day of carbon dioxide and 900 kg/day of steam (which can be used in the hydrogen manufacturing unit) can be co-produced.

Example 3

A hydrocarbonaceous feedstock as defined in Example 1 can be subjected to a treatment with hydrogen in the presence of a supported catalyst as described in Example 1 designed at producing electricity for export. With a hydrogen consumption of 300 kg/day of hydrogen and under a conversion level of 90% per pass, an amount of 15% wt, calculated on initial feedstock, of kerosene and gas oil can be produced. After removal of hydrogen sulphide and separating off recycle hydrogen, 85% wt, calculated on initial intake, of material containing naphtha and lower boiling material can be sent to the hydrogen manufacturing unit to which 11 ton/day of steam is sent as well. Under normal conditions 27 ton/day of carbon dioxide will be produced together with 1.75 ton/day of hydrogen. The electricity generating unit can be operated such as to deliver 820 kW of electricity of which 70 kW can be used to satisfy the utilities of the process line up and 750 kW can be offered to the local grid. In this embodiment some 10.3 ton/day of water will be co-produced.

Example 4

A hydrocarbonaceous feedstock as defined in Example 1 can be subjected to a treatment with hydrogen in the presence of a supported catalyst as described in Example 1 designed at producing as main products hydrogen (in excess) and electricity to satisfy the utilities of the process whilst not producing final hydroprocessed product. With a hydrogen consumption of 400 kg/day and under a conversion level of 90% per pass, a hydrotreated feedstock is produced, which after hydrogen sulphide removal and separating off hydrogen can be sent in its entirety to the hydrogen manufacturing unit which also needs to be supplied with 13 ton/day of steam. The unit can produce 2.05 ton/day of hydrogen of which 1.5 ton/day can be available for export, whilst 125 kg/day has to be sent to the electricity generating unit to produce the required amount of electricity, the balance can be sent to the hydrotreatment unit to contribute to the hydrogen demand in said unit. In the process 32 ton/day of carbon dioxide and 900 kg/day of steam (which can be sent to the hydrogen manufacturing unit) can be co-produced.

Example 5

A hydrocarbonaceous feedstock as defined in Example 1 can be subjected to a treatment with hydrogen in the presence of a supported catalyst as described in Example 1 designed at producing excess electricity as the main product together with hydrogen to satisfy the demands of the process whilst not producing a separate hydroprocessed product. With a hydrogen consumption of 400 kg/day of hydrogen and under a conversion level of 90% per pass to be obtained by using a zeolite beta type catalyst a hydrotreated feedstock is produced, which after hydrogen sulphide removal and separating off recycle hydrogen can be sent in its entirety to the hydrogen manufacturing unit which also needs to be supplied with 13.5 ton/day of stream. The unit can produce 2.1 ton/day of hydrogen of which an amount to satisfy the internal needs of the process can be sent to the hydrotreatment unit (taking into account the amount of hydrogen already liberated in the separating off operation prior to hydrogen manufacture). The remainder (majority of the hydrogen produced) can be sent to a fuel cell which is capable of producing 920 kW of electricity. In this embodiment 32 ton/day of carbon dioxide (ex hydrogen manufacturing unit) and 12 ton/day of water can be co-produced.

Example 6

A hydrocarbonaceous feedstock as defined in Example 1 can be subjected to a treatment with hydrogen in the presence of a supported catalyst as described in Example 1 designed at producing all three main products (hydroprocessed product, hydrogen and electricity) in accordance with the present invention. In the way as described in Example 2, 45% wt of kerosene and gas oil can be produced as hydroprocessed product. 55% wt, calculated on intake material containing naphtha and lower boiling materials can be sent to the hydrogen manufacturing unit to which 7.1 ton steam/day is sent as well. Under normal conditions 1.1 ton/day of hydrogen can be produced of which 125 kg/day is needed to generate the electricity needed for the utilities, 125 kg/day of hydrogen can be used for export purposes and the remainder of the hydrogen produced in the hydrogen manufacturing unit (having taken into account the demand on hydrogen for the hydrotreatment unit, in combination with hydrogen already liberated by separating off hydrogen prior to the hydrogen manufacturing stage) can be sent to the electricity generating unit to produce 425 kW of electricity/day. In this process embodiment 17 ton/day of carbon dioxide and 5.6 ton/day of steam (to be used in the hydrogen manufacturing unit) can be co-produced as well.

Example 7

A hydrocarbonaceous feedstock as defined in Example 1 can be subjected to a treatment with hydrogen in the presence of a supported catalyst as described in Example 1 designed at producing hydroprocessed product and excess electricity and captive hydrogen. With a hydrogen consumption of 150 kg/day of hydrogen and under a conversion level of 65% per pass to be obtained by using a zeolite beta type catalyst, 72% wt of kerosene and gas oil can be produced as hydroprocessed product. 28% wt, calculated on intake material containing naphtha and lower boiling materials can be sent to the hydrogen manufacturing unit to which 3.6 ton/day of steam is sent as well. Under normal conditions 550 kg/day of hydrogen can be produced of which an amount to satisfy the internal needs of the process can be sent to the hydrotreatment unit, of which 125 kg/day is needed to generate the electricity required for the utilities and the remainder can be converted into electricity (150 kW) in the electricity generating unit. In the process 8.9 ton/day of carbon dioxide am and 2.9 ton/day of steam (which can be sent to the hydrogen manufacturing unit) can be co-produced as well.

Example 8

A hydrocarbonaceous feedstock as defined in Example 1 can be subjected to a treatment with hydrogen in the presence of a supported catalyst as described in Example 1 designed at producing hydroprocessed product, hydrogen and electricity (in excess of the amount needed to satisfy the utilities) in which both hydrogen and electricity are produced from hydrotreated feedstock. With a hydrogen consumption of 300 kg/day of hydrogen and under a conversion level of 90% per pass to be obtained by a zeolite beta type catalyst, 15% wt of kerosene and gas oil can be produced as hydroprocessed product. 85% wt, calculated on intake material containing naphtha and lower boiling material can be used for the production of hydrogen and electricity, starting from this material. Suitably, 17% wt of this material can be sent to the hydrogen manufacturing unit to which 2 ton/day of steam is sent as well. Under normal conditions, 300 kg/day of hydrogen can be produced in order to satisfy the internal demands of the process whilst 4.5 ton/day of carbon dioxide can be co-produced. 83% wt of the total amount of naphtha and lower boiling material can suitably be sent to the electricity generating unit to produce 1,820 kW of electricity of which typically 70 kW can be applied to satisfy the requirements of the process and 1,750 kW is available for export. In this process embodiment 22.5 ton/day of carbon dioxide can be co-produced as well.

Example 9

A hydrocarbonaceous feedstock as defined in Example 1 can be subjected to a treatment with hydrogen in the presence of a supported catalyst as described in Example 1 designed at producing as products hydrogen and electricity, which products both have been produced from hydrotreated feedstock (i.e. no hydroprocessed product is to be recovered in this embodiment). With a hydrogen consumption of 400 kg/day of hydrogen and under a conversion level of 90% per pass to be obtained by a zeolite beta type catalyst, the hydrotreated feedstock obtained can be used, after hydrogen sulphide removal and separating off hydrogen, to produce hydrogen and electricity therefrom. Suitably 25% wt of this material can be sent to the hydrogen manufacturing unit to which 2.55 ton/day of steam is sent as well. Under normal conditions 400 kg/day of hydrogen can be produced in order to satisfy the internal demands of the process whilst 6 ton/day of carbon dioxide can be co-produced. 76% wt of the hydrotreated feedstock can suitably be sent to the electricity generating unit to produce 2,120 kW of electricity of which typically 70 kW can be applied to satisfy the requirements of the process and 2,050 kW is available for export. In this process embodiment 26 ton/day of carbon dioxide can be co-produced as well.

What is claimed is:

1. A method for treating hydrocarbonaceous feedstock to produce hydrogen, electricity, and one or more liquid hydrocarbon product, the method comprising:
    a) subjecting hydrocarbonaceous feedstock to hydrotreating hydrogen in the presence of supported catalyst under hydrotreating conditions effective to produce hydrotreated product comprising one or more liquid hydrocarbon product;
    b) subjecting hydrotreated product to hydrogen production conditions effective to produce hydrogen product;
    c) subjecting a first part of the hydrogen product to electricity generating conditions effective to produce electricity; and
    d) recycling a second part of the hydrogen product as hydrotreating hydrogen.

2. The method of claim 1 further comprising:
    recovering one or more liquid hydrocarbon product from the hydrotreated product, leaving hydrotreated product remainder; and
    subjecting hydrotreated product remainder to the hydrogen production conditions.

3. The method of claim 2 further comprising providing hydrocarbonaceous feedstock comprising a fraction having a boiling point range the same as or higher than the one or more liquid hydrocarbon product.

4. The method of claim 3 wherein the hydrotreated product has a boiling point range different from boiling point range of the hydrocarbonaceous feedstock.

5. The method of claim 4 further comprising providing hydrocarbonaceous feedstock having a boiling point range of from about ambient to about 650° C. at standard conditions comprising 20° C. 1 atmosphere.

6. The method of claim 4 further comprising providing hydrocarbonaceous feedstock having a 90% boiling point range of from about 400° C. to 600° C. at standard conditions.

7. The method of claim 6 further comprising providing hydrocarbonaceous feedstock comprising 5% wt. sulfur or less.

8. The method of claim 4 wherein the fraction is from about 5% wt to about 40% wt. of the hydrocarbonaceous feedstock.

9. The method of claim 8 wherein the fraction has a boiling point range higher than the one or more liquid hydrocarbon product.

10. The method of claim 9 wherein the one or more liquid hydrocarbon product is selected from the group consisting of kerosene and gas oil.

11. The method of claim 10 wherein the hydrogen production conditions comprise catalytic oxidation conditions effective to produce hydrogen product and carbon (di) oxide.

12. The method of claim 11 wherein the catalytic oxidation conditions comprise catalytic partial oxidation conditions.

13. The method of claim 11 wherein said electricity generating conditions comprise feeding at least some of the hydrogen product to a fuel cell under fuel cell conditions effective to produce electricity.

14. The method of claim 13 wherein the fuel cell conditions produce an amount of electricity in excess of a total amount of electricity needed the method.

15. The method of claim 13 wherein the fuel cell conditions produce fuel cell steam, the hydrogen production conditions comprising subjecting hydrotreating product to fuel cell steam.

16. The method of claim 13 wherein the catalytic oxidation conditions comprise watergas-shift conditions effective convert hydrocarbonaceous feedstock and watergas-shift water to one or more catalytic oxidation product selected from the group consisting of kerosene and gas oil.

17. The method of claim 16 wherein the hydrotreating conditions produce hydrogen sulfide, the method further comprising converting the hydrogen sulfide into elemental sulfur.

18. The method of claim 2 wherein the hydrogen production conditions comprise catalytic oxidation conditions effective to produce hydrogen product and carbon (di) oxide.

19. The method of claim 18 wherein the catalytic oxidation conditions comprise catalytic partial oxidation conditions.

20. The method of claim 1 further comprising providing hydrocarbonaceous feedstock comprising 5% wt. sulfur or less.

21. The method of claim 1 wherein the one or more liquid hydrocarbon product is selected from the group consisting of kerosene and gas oil.

22. The method of claim 1 wherein said electricity generating conditions comprise feeding at least some of the hydrogen product to a fuel cell under fuel cell conditions effective to produce electricity.

23. The method of claim 1 wherein the supported catalyst comprises zeolite beta.

24. The method of claim 1 wherein the supported catalyst is effective to convert at least 90% wt. per pass of hydrocarbonaceous feedstock to one more liquid hydrocarbon product.

25. The method of claim 16 wherein the supported catalyst comprises zeolite beta.

26. The method of claim 16 wherein the supported catalyst is effective to convert at least 90% wt. per pass of the hydrocarbonaceous feedstock to one or more liquid hydrocarbon product.

27. The method of claim 26 wherein the hydrotreating conditions comprise
    a temperature of from about 100° C. to about 550° C.; and,
    a pressure of 400 atmospheres or less.

28. The method of claim 27 wherein the method requires a total amount of hydrogen and a total quantity of electricity, and the catalytic oxidation conditions and the fuel cell conditions generate the total amount of hydrogen or more and the total quantity of electricity or more.

29. The method of claim 27 wherein the hydrotreated product further comprises lower boiling hydrocarbons containing at most 4 carbon atoms.

30. The method of claim 29 further comprising separating remaining hydrotreating hydrogen from the hydrotreated product prior to subjecting at least a portion of the hydrotreated product to hydrogen production conditions.

31. The method of claim 30 further comprising providing hydrocarbonaceous feedstock comprising about 3% wt. sulfur or less.

32. The method of claim 1 wherein the hydrotreating conditions comprise
  a temperature of from about 100° C. to about 550° C.; and
  a pressure of 400 atmosphere or less.

33. The method of claim 16 wherein the hydrotreating conditions comprise
  a temperature of from about 100° C. to about 550° C.; and,
  a pressure of 400 atmosphere or less.

34. A method for treating hydrocarbonaceous feedstock to produce hydrogen, electricity, and one or more liquid hydrocarbon product, the method comprising:
  a) subjecting hydrocarbonaceous feedstock to hydrotreating hydrogen in the presence of supported catalyst under hydrotreating conditions effective to produce hydrotreated product comprising one or more liquid hydrocarbon product;
  b) subjecting hydrotreated product to catalytic partial oxidation conditions effective to produce catalytic partial oxidation product;
  c) subjecting catalytic partial oxidation product to watergas-shift water under watergas-shift conditions effective to produce hydrogen product and carbon dioxide;
  d) recycling a first part of the hydrogen product as the hydrotreating hydrogen, the hydrotreating hydrogen being produced from no feedstocks other than the hydrocarbonaceous feedstock and watergas-shift water; and,
  e) subjecting a second part of the hydrogen product to electricity generating conditions effective to produce electricity.

35. The method of claim 34 wherein the carbon dioxide is produced from no feedstocks other than the hydrocarbonaceous feedstock and the watergas-shift water.

36. The method of claim 35 wherein the electricity is produced from no feedstocks other than the hydrocarbonaceous feedstock and the watergas-shift water.

37. The method of claim 36 wherein the supported catalyst converts at least about 65% wt. per pass of a fraction of the hydrocarbonaceous feedstock having a boiling point range the same as or above the one or more liquid hydrocarbon.

38. The method of claim 37 wherein the hydrotreating conditions comprise a temperature of from about 250° C. to about 450° C.; and
  a pressure of from about 10 to about 200 atmospheres.

39. A method for treating hydrocarbonaceous feedstock to produce hydrogen, electricity, and one or more liquid hydrocarbon product, the method comprising:
  a) providing hydrocarbonaceous feedstock comprising about 5% wt. sulfur or less, said hydrocarbonaceous feedstock having a boiling point of from about ambient to about 650° C. at standard conditions comprising 20° C. and 1 atmosphere;
  b) subjecting the hydrocarbonaceous feedstock to hydrotreating hydrogen in the presence of supported catalyst comprising zeolite beta under hydrotreating conditions effective to produce hydrotreated product comprising one or more liquid hydrocarbon product selected from the group consisting of kerosene and gas oil, the hydrotreated product having a first boiling point range different from the hydrocarbonaceous feedstock, the hydrocarbonaceous feedstock comprising a fraction of from about 5% wt. to about 40% wt. having a second boiling point range the same as or higher than the one or more liquid hydrocarbon product;
  c) recovering at least some of the one or more liquid hydrocarbon product, leaving hydrotreated product remainder;
  d) subjecting at least some of the hydrotreated product remainder to catalytic partial oxidation conditions effective to produce catalytic partial oxidation product;
  e) subjecting catalytic partial oxidation product to watergas-shift water under watergas-shift conditions effective to convert the hydrotreated product remainder to hydrogen product and to a watergas-shift product selected from the group consisting of kerosene and gas oil;
  f) feeding a first part of the hydrogen product to a fuel cell under electricity generating conditions effective to produce electricity; and,
  g) recycling a second part of the hydrogen product as hydrotreating hydrogen.

40. The method of claim 34 wherein the supported catalyst converts at least 90% wt. per pass of hydrocarbonaceous feedstock to the one or more liquid hydrocarbon product.

41. The method of claim 40 wherein the hydrotreating conditions are effective to produce hydrogen sulfide, the method further comprising converting the hydrogen sulfide into elemental sulfur.

42. The method of claim 41 further comprising providing hydrocarbonaceous feedstock having a 90% boiling point range of from about 400° C. to about 600° C. at standard conditions.

43. The method of claim 42 wherein the fuel cell conditions produce fuel cell steam, the watergas-shift water comprising fuel cell steam.

44. The method of claim 43 wherein the hydrotreating conditions comprise a temperature of from about 100° C. to about 550° C. and a pressure of 400 atmospheres or less.

45. The method of claim 44 wherein the method requires a total amount of hydrogen and a total quantity of electricity, and the watergas-shift conditions and the fuel cell conditions generate the total amount of hydrogen or more and the total quantity of electricity or more.

46. The method of claim 45 wherein the hydrotreated product comprises hydrocarbons containing at most 4 carbon atoms.

47. The method of claim 46 further comprising separating remaining hydrotreating hydrogen from the hydrotreated product before subjecting at least a portion of hydrotreated product to the hydrogen production conditions.

48. The method of claim 47 wherein the hydrocarbonaceous feedstock comprises about 3% wt sulfur or less.

49. A method for treating hydrocarbonaceous feedstock to produce hydrogen, electricity, and one or more liquid hydrocarbon product, the method comprising a) subjecting hydrocarbonaceous feedstock to hydrotreating hydrogen under hydrotreating conditions comprising supported zeolite catalyst effective to produce hydrotreated product comprising one or more liquid hydrocarbon product;

b) subjecting at least a portion of the hydrotreated product to hydrogen production conditions effective to produce hydrogen product;

c) subjecting a first part of the hydrogen product to electricity generating conditions effective to produce electricity; and, d) recycling a second part of the hydrogen product as hydrotreating hydrogen.

50. The method of claim 41 further comprising:

recovering one or more liquid hydrocarbon product from the hydrotreated product, leaving hydrotreated product remainder; and subjecting the hydrotreated product remainder to the hydrogen production conditions.

51. The method of claim 50 wherein the hydroprocessed product is selected from the group consisting of kerosene and gas oil.

52. The method of claim 51 wherein the hydrogen production conditions comprise catalytic oxidation conditions effective to produce hydrogen product and carbon (di) oxide.

53. The method of claim 52 wherein the catalytic oxidation conditions comprise catalytic partial oxidation conditions.

54. The method of claim 52 wherein said electricity generating conditions comprise feeding at least some of the hydrogen product to a fuel cell under fuel cell conditions effective to produce electricity.

55. The method of claim 54 wherein the fuel cell conditions produce fuel cell steam, the hydrogen production conditions comprising subjecting hydrotreated product to fuel cell steam.

56. The method of claim 55 wherein the hydrotreating conditions comprise a temperature of from about 100° C. to about 550° C.; and, a pressure of 400 atmospheres or less.

57. The method of claim 56 wherein the method requires a total amount of hydrogen and a total quantity of electricity, and the catalytic oxidation conditions and the fuel cell conditions generate the total amount of hydrogen or more the total quantity of electricity or more.

58. The method of claim 55 further comprising separating remaining hydrotreating hydrogen from the hydrotreated product prior to subjecting at least a portion of the hydrotreated product to hydrogen production conditions.

59. The method of claim 49 wherein the hydroprocessed product is selected from the group consisting of kerosene and gas oil.

60. The method of claim 49 wherein the hydrogen production conditions comprise catalytic oxidation conditions effective to produce hydrogen product and carbon (di) oxide.

61. The method of claim 60 wherein the catalytic oxidation conditions comprise catalytic partial oxidation conditions.

62. The method of claim 49 wherein said electricity generating conditions comprise feeding at least some of the hydrogen product to a fuel cell under fuel cell conditions effective to produce electricity.

63. The method of claim 49 wherein the hydrotreating conditions comprise a temperature of from about 100° C. to about 550° C.; and, a pressure of 400 atmospheres or less.

64. The method of claim 49 further comprising separating remaining hydrotreating hydrogen from the hydrotreated product prior to subjecting at least a portion of the hydrotreated product to hydrogen production conditions.

65. The method of claim 49 wherein the supported zeolite catalyst is zeolite beta.

\* \* \* \* \*